No. 736,519. PATENTED AUG. 18, 1903.
C. J. HODGE.
QUARTZ MILL.
APPLICATION FILED NOV. 10, 1902.
NO MODEL. 2 SHEETS—SHEET 1.

Witnesses:

Inventor:
Chas. J. Hodge
by Elliott & Hopkins
attys

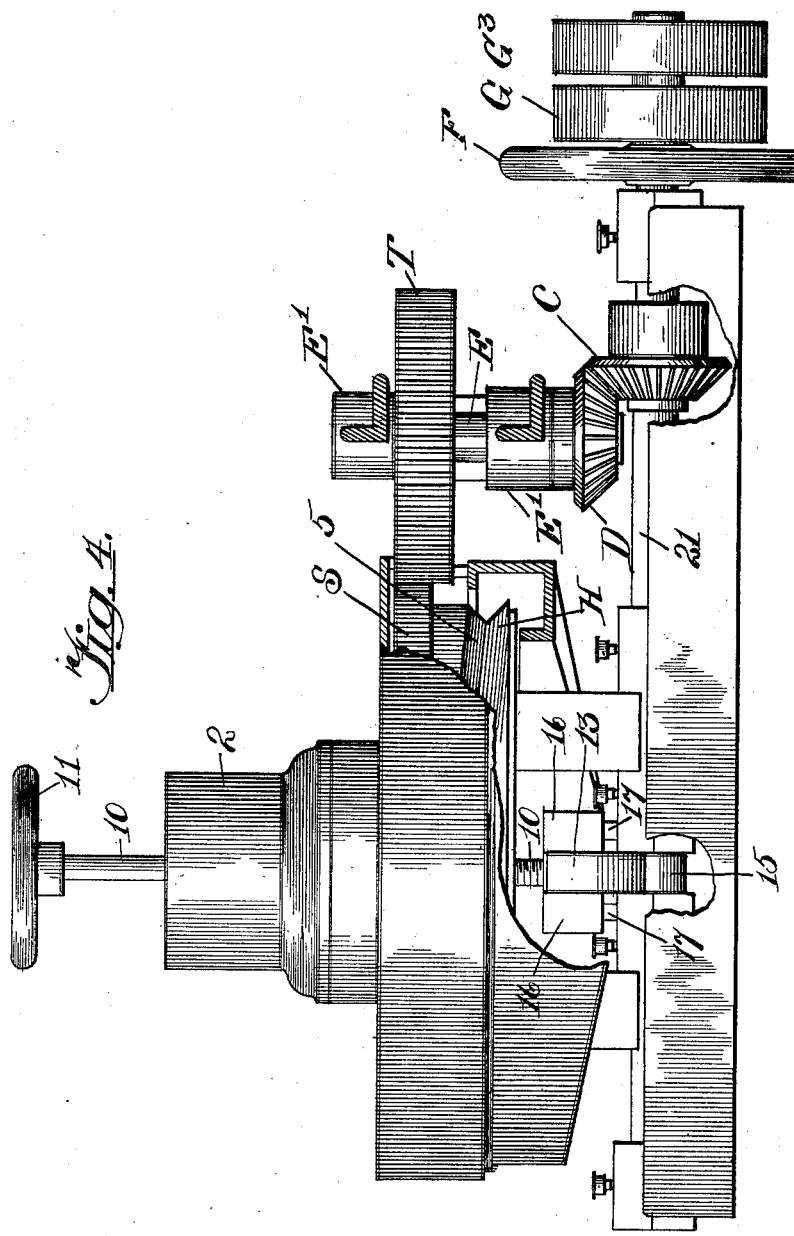

No. 736,519. Patented August 18, 1903.

UNITED STATES PATENT OFFICE.

CHARLES J. HODGE, OF HOUGHTON, MICHIGAN.

QUARTZ-MILL.

SPECIFICATION forming part of Letters Patent No. 736,519, dated August 18, 1903.

Application filed November 10, 1902. Serial No. 130,629. (No model.)

*To all whom it may concern:*

Be it known that I, CHARLES J. HODGE, a citizen of the United States, residing at Houghton, in the county of Houghton, State of Michigan, have invented certain new and useful Improvements in Quartz-Mills, of which the following is a full, clear, and exact specification.

My invention relates to that type of quartz-mills shown in my United States Patent No. 317,359, for example, in which the material to be crushed or ground is fed between two revolving cones, one of which is periodically moved away from the other to permit the ground material to escape and the unground material to enter between the grinding-faces. The improvements have more especial reference to the means for periodically raising the upper cone; and the invention has for its object to provide means whereby the movable cone will be raised quickly the required distance, but without the shock and jar incident to the operation of mechanism—such, for example, as that employed in my prior patent for accomplishing this movement.

With these ends in view my invention consists in certain features of novelty in the construction, combination, and arrangement of parts by which the said object and certain other objects hereinafter appearing are attained, all as fully described with reference to the accompanying drawings and more particularly pointed out in the claims.

Figure 1:
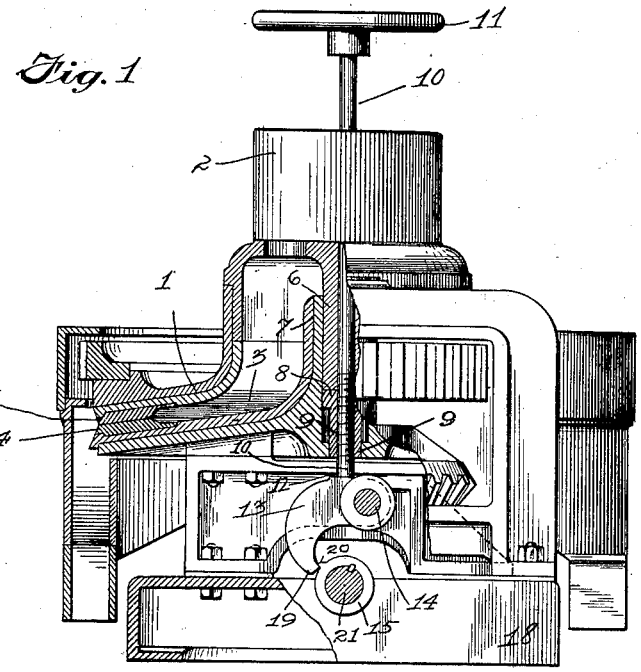
Figure 2:
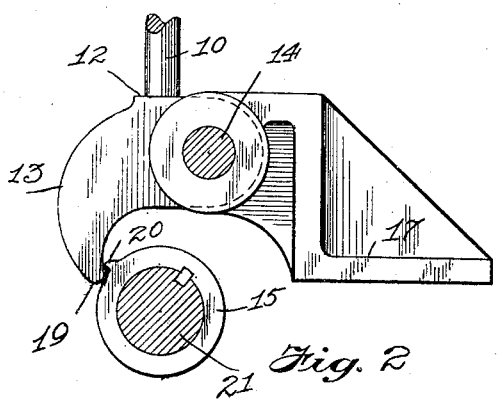
Figure 3:
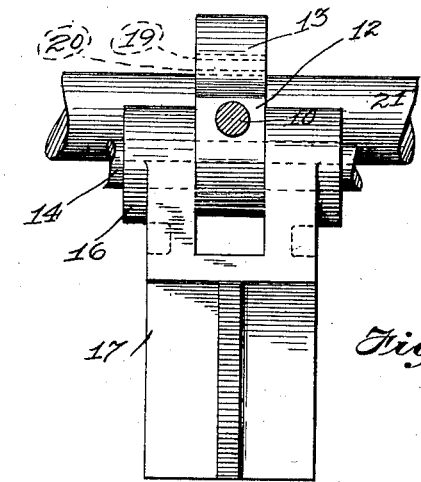

In the said drawings, Figure 1 is a side elevation of a quartz-mill provided with my improvements, partially broken away and shown in vertical section. Fig. 2 is an enlarged detail view of the cone-lifting mechanism hereinafter described. Fig. 3 is a plan view thereof; and Fig. 4 is a view similar to Fig. 1 looking at a different side of the machine, showing the driving mechanism.

1 is the upper cone, above which is arranged a suitable feed-hopper 2, and 3 is the lower cone, provided with a grinding-face 4, upon which rests a companion face 5 on the under side of the upper cone, all constructed and arranged as usual or in any suitable way.

6 is the vertical pivot of the upper cone, which is journaled in a sleeve 7 of the lower cone, stepped on the upper side of a nut 8, arranged to slide vertically in the sleeve 7, but held against rotary motion therein in any suitable way, as by means of a squared stem. This nut is threaded on an upright screw or shaft 10, which fits accurately in the pivot 6, and is provided at its upper end with a hand-wheel 11, whereby it may be rotated for relatively adjusting the grinding-faces 4 5 of the cones. The lower end of this shaft or screw 10 is supported upon a suitable bearing-face 12 of a lever 13, which is pivoted at one end on a pivot 14 and rests at its other end against the periphery of a cam 15. The pivot 14 is supported in a pair of gears 16, formed on a suitable bracket 17, which is supported upon the base 18 of the mill. The free end of the lever 13 is curved downwardly and away from the vertical axis of the shaft or screw 10 and where it rests upon the cam 15 is preferably rounded on one side, as shown at 19, to permit a projection 20 on the cam to readily pass the lever and lift it in doing so. The periphery of the cam, excepting where the projection 20 is located, is circular, so that the lever 13 will remain stationary until it is engaged by the projection 20, which occurs at each revolution, and consequently at each revolution the upper cone is lifted from the lower cone the proper distance for allowing the ground material to escape and the unground material to enter between the grinding-faces, and the point of engagement between the projection 20 and the lever 13 being considerably removed from the line of the vertical axis of the screw 10 it will be understood that the lifting action will be accomplished without shock and jar, as heretofore, and also with less strain and wear on the journals and the engaging parts. The cam 15 is supported upon the usual driving-shaft 21.

The upper cone may be rotated in any suitable way, as by means of a gear-ring S, secured to the upper side thereof and engaging a spur-gear T, mounted on shaft E in suitable bearings E' and carrying at its lower end a bevel-pinion D, which derives motion from bevel-pinion C on driving-shaft 21, the latter being driven by pulley G, $G^3$ being an idler and F being a fly-wheel.

Having thus described my invention, what I claim as new therein, and desire to secure by Letters Patent, is—

1. In a quartz-mill the combination of two relatively movable grinding-cones, a step upon which the pivot of one of said cones is mounted, a driving-shaft operatively connected with said cones, a cam on said driving-shaft, and a pivoted lever engaging said cam and supporting said step, substantially as set forth.

2. In a quartz-mill the combination of two relatively movable grinding-cones one of which is provided with a vertical pivot, a step supporting said vertical pivot, a driving-shaft, a cam on said shaft having a circular periphery with a projection thereon, and a lever supporting said step and resting upon said cam, substantially as set forth.

3. In a quartz-mill the combination of two relatively movable grinding-cones, one of which is provided with a vertical sleeve and the other with a pivot arranged in said sleeve, a nut located in said sleeve and supporting said pivot, a screw passing through said pivot and nut, a pivoted lever supporting said screw, a driving-shaft, and a cam engaging said lever, substantially as set forth.

CHARLES J. HODGE.

Witnesses:
F. A. HOPKINS,
M. B. ALLSTADT.